United States Patent [19]

Hogg et al.

[11] Patent Number: 5,408,412
[45] Date of Patent: Apr. 18, 1995

[54] ENGINE FAULT DIAGNOSTIC SYSTEM

[75] Inventors: George W. Hogg; Karen A. Carron, both of Palm Beach Gardens; Brian D. Wright, West Palm Beach; Craig T. Stambaugh, Sr., Port St. Lucie, all of Fla.

[73] Assignee: United Technologies Corporation, Hartford, Conn.

[21] Appl. No.: 865,428

[22] Filed: Apr. 9, 1992

[51] Int. Cl.[6] .............................................. G06F 15/20
[52] U.S. Cl. ........................... 364/424.03; 364/424.04; 364/431.01; 364/551.01; 73/117.2
[58] Field of Search .................... 364/424.03, 424.04, 364/431.01, 431.11, 550, 551.01; 73/117.2, 117.3; 340/438, 439

[56] References Cited

U.S. PATENT DOCUMENTS

| 4,841,456 | 6/1989 | Hogan, Jr. et al. | 364/550 |
| 4,967,337 | 10/1990 | English et al. | 364/550 |
| 4,975,865 | 12/1990 | Carrette et al. | 364/550 |
| 4,985,857 | 1/1991 | Bajpai et al. | 364/551.01 |
| 5,018,069 | 5/1991 | Pettigrew | 364/551.01 |
| 5,023,791 | 6/1991 | Herzberg et al. | 364/424.04 |
| 5,164,912 | 11/1992 | Osborne et al. | 364/551.01 |
| 5,208,745 | 5/1993 | Quentin et al. | 364/551.01 |
| 5,210,704 | 5/1993 | Husseiny | 364/551.01 |
| 5,214,582 | 5/1993 | Gray | 364/551.01 |
| 5,274,572 | 12/1993 | O'Neill et al. | 364/550 |

Primary Examiner—Gary Chin
Attorney, Agent, or Firm—McCormick, Paulding & Huber

[57] ABSTRACT

A diagnostic system for use in troubleshooting malfunctions in an aircraft engine control system receives sensor data obtained during a flight. The sensor data is supplemented by signals indicative of the operation of the engine control system's computer. The combined data is downloaded to the diagnostic system. Included in the diagnostic system is an inference engine and knowledge database. The diagnostic system includes a computer for executing a plurality of algorithms by means of the inference engine using the downloaded data and knowledge database as input to aid the technician in correctly determining the source of malfunctions in a minimum of time. The diagnostic system is capable of processing "unknown" responses to diagnostic system inquiries and can retrocede a step or steps during the execution of diagnostic system algorithms.

19 Claims, 5 Drawing Sheets

```
F1 Abrt  F3 Suspd  F4 EC  F5 Sum  F6 Bkup  F7 Abrt EC  F8 Sch/Tbl  ^L Ts Ltr
  to the FADEC fails local channel range check.
                                                      ┌116
Perform a resistance check at connector P7 of channel A.
   Was a discrepancy found?
>>y
Perform a resistance check at Augmentor Control connector J63.
   Was a discrepancy found?
>>
Backing up a step . . .   ┌122

Troubleshooting event code 71 on channel A, run 2.

WF2 Actuator Position Hard Failure

Description:
    RVDT which provides WF2 metering valve position feedback
    to the FADEC fails local channel range check.

Perform a resistance check at connector P7 of channel A.
    Was a discrepancy found?

Enter "y" for yes, "n" for no, "u" for unknown, or "why".           READY
```
114⁾        FIG. 7

┌120

*Flight Clearance Release*

If the problem does not repeat, release the engine for flight. Otherwise, based on previous maintenance action, replace components in the following order until the condition is cleared:

- Augmentor Control

- FADEC (local channel)

- Augmentor Control Cable (local channel)

FIG. 8

ENGINE FAULT DIAGNOSTIC SYSTEM

TECHNICAL FIELD

The present invention relates to automatic test equipment generally, and more particularly to engine fault diagnostic systems for use in troubleshooting malfunctions of airplane engines.

BACKGROUND OF THE INVENTION

Automatic test equipment (ATE) have become well known in the art. These systems are used with a variety of applications, including aerospace, semiconductor processing and automotive systems. A typical ATE device comprises a controller to methodically operate an apparatus (such as a jet engine control system) so that sensors measure one or more parametric values generated by the apparatus. The results of the test can then be viewed by the operator or stored in an associated memory for later analysis.

Automatic test equipment in general are not adapted for use in diagnosing malfunctioning systems. Consequently, field service personnel have been limited to the use of manuals designed and written by an expert troubleshooter to aid in the determination of faults for that particular apparatus. As automotive, electronic and aircraft systems have increased in complexity, so have the problems associated with accurately and economically troubleshooting malfunctioning components.

An example of diagnostic equipment for use in troubleshooting systems includes the automotive vehicle trouble checking apparatus disclosed in U.S. Pat. No. 4,839,811. The '811 apparatus is used with an automobile having sensors providing signals indicative of the various engine parameters. The apparatus includes a control circuit responsive to the sensor signals for calculating a value corresponding to a setting of each of a plurality of means for controlling the automotive vehicle. A self-checking unit is connected to the control circuit for checking sensor signals applied to the control circuit to provide a self-checking code indicative of the cause of automotive vehicle trouble when at least one of the sensor signals generates an abnormal value. The external trouble checking unit is connected through a detachable connector to the self-checking unit for utilizing the sensor signals fed to the control circuit and the self-checking code to find a cause of the automotive trouble. The '811 apparatus allows the incorporation of a knowledge database of known parameters along with a logic to allow first order analysis of the sensed signals.

Japanese Patent No. 62-6857 discloses another fault diagnostic apparatus for use with vehicles. The system includes a plurality of predicting systems including forward, rearward and inquiring systems through a selecting means. The system predicts the causes of the sensed fault on the basis of symptom information in accordance with the selected predicting system.

The current generation of airplane electronic engine control (EEC) systems are more sophisticated than aircraft control systems of the prior art and are substantially more elaborate than those which are found in other applications, such as in automobiles. These systems include redundant sensors and control system componentry as part of the overall aircraft EEC system. The enhanced control features of these EEC systems result in a more complicated system with correspondingly more complex diagnostic procedures which must be followed to properly troubleshoot a malfunction. This increased complexity places still higher demands on the quality of the service technician, as problems must be addressed in an ever more rigorous and systematic manner that require higher levels of skill and extraordinary discipline.

In recent years "expert systems" have been developed as an analysis aid for a variety of applications. These expert systems are computer based systems characterized by a set of user defined rules and facts stored in a knowledge database, as well as a software user interface. An "inference engine" is included that processes these rules and facts to conclude new facts and rules. The inference engine can prompt a technician for additional information to aid in the troubleshooting process.

An example of a device incorporating an expert system is the portable maintenance aid (PMA) offered by the Grumman Corporation. The PMA attempts to provide the technician with a digitized version of the troubleshooting manual whose access is aided and controlled by an expert system. The troubleshooting manual is written and placed in digital form in a computer. The Grumman PMA receives a series of inputs from the maintenance technician and responds with corresponding series of excerpts from the manual.

Known maintenance aid systems of this type are more appropriately characterized as "interactive electronic publications", since the expert system is utilized as an aid in stepping the maintenance technician through the complicated electronic manuals at an increased speed to reduce troubleshooting time. That is, the expert system reorders the maintenance manual on the basis of questions to and answers from the technician to provide a more efficient path to isolate the problem.

In view of the above, it would be advantageous to have a diagnostic system adapted for use with troubleshooting aircraft engine systems that would be able to be used by a technician having minimum skill and which could tolerate mistakes made thereby and yet would allow for economical and accurate diagnosis of defective components. The present invention is drawn towards such a system.

SUMMARY OF INVENTION

An object of the present invention is to provide a diagnostic system adapted for use with aircraft engine control systems that allows for quick and accurate diagnosis of engine faults.

Another object of the present invention is to provide a diagnostic system of the foregoing type that directly guides the technician in troubleshooting engine faults.

Still another object of the present invention is to provide a diagnostic system of the foregoing type that directly incorporates engine fault data with an expert diagnostic system.

Yet another object of the present invention is to provide a system of the foregoing type that allows for the technician to retrocede in the diagnostic process to correct incorrect information.

According to the present invention, a diagnostic system for use in diagnosing a malfunction of a component of an aircraft engine from engine sensor signals, including signals corresponding to engine faults, includes a diagnostic supervisor for generating system command signals and an apparatus responsive to data command signals for receiving the engine sensor signals and generating command signals to upload malfunction information signals to an aircraft control system. An input/output device receives signals from and sends signals to a technician. A knowledge memory is included having stored therein signals corresponding to a database of engine sensor signal values and facts as well as signals corresponding to rules relating to each of the engine sensor signal values and facts with selected ones thereof, with the rules each including a logical premise and conclusion. Also, an inference engine receives the knowledge memory signals and generates signals for presentation to the input/output means indicative of the results of a test to establish the cause of an engine fault signal. The test includes the steps of determining a first series of rules to be tested, searching the knowledge memory for signals corresponding to a selected one of the engine sensor signal values and facts that establish the validity of a first rule conclusion, generating signals for the input/output apparatus for querying the technician for input signals on the first rule conclusion, receiving signals from the input/output apparatus indicative of technician input signals, generating signals corresponding to a first rule premise associated with the first conclusion in dependence on the establishment of the validity of the first rule conclusion and determining a second series of rules to be tested in dependence on the first rule premise signal value.

BRIEF DESCRIPTION OF THE DRAWINGS

FIG. 7 is an illustration of a second frame displayed to a technician by the diagnostic system of FIG. 1.

FIG. 8 is a portion of a page in an engine fault diagnostic manual.

DESCRIPTION OF THE PREFERRED EMBODIMENT

Figure 1:
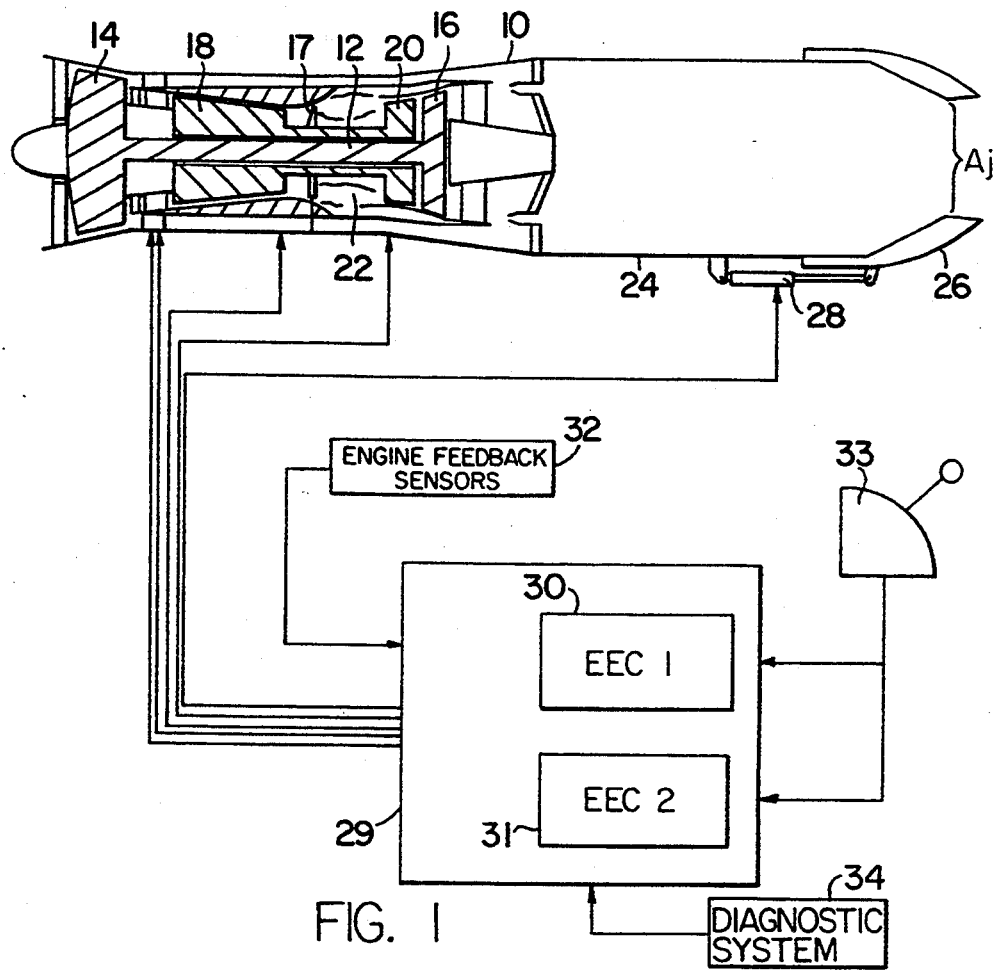
FIG. 1 is a simplified schematic illustration of a jet engine having an electronic engine control.

As noted above, control systems in general have increased markedly in complexity in the past several years. These control systems are used for a variety of applications including automobile engines, jet engines and the like. Automobile engine control systems are simple as compared to jet engines, and therefore the control system and diagnostic procedures associated with automobiles are correspondingly rudimental.

In contrast, the complexity associated with modern jet engines and the need for ever more precision in control and measurement of jet engine parameters has resulted in a new generation of digital electronic engine controls (DEEC) and, more recently, the full authority digital electronic control (FADEC) type of control system such as the one marketed by the Pratt & Whitney division of United Technologies Corporation for use in controlling the F119 jet engine. An example of such a flight control system is disclosed in U.S. patent application Ser. No. 618,686 and is incorporated herein by reference. The FADEC flight control system is characterized by redundant sensor and control system componentry. These systems are further characterized by simultaneous generation of control signals with an overarching controller component checking for controller and/or sensor failure. Should a failure be detected either in the system hardware, software or in the sensor components in one of the systems, the FADEC system will automatically switch over to the remaining system for control.

Since the complexity of these systems is breathtaking, the troubleshooting process associated with a malfunction is correspondingly formidable. This combination yields a troubleshooting process that places very high demands on the technician who must service these engines in the field. This requirement comes about partly because troubleshooting has traditionally been performed with the aid of a manual. Most troubleshooting manuals outline their procedures in a logical sequence instructing the technician to step through an algorithm to arrive at the source of the malfunction. The manual often must comprise a plurality of algorithms in accordance with the number of components that can fail. For systems such as the FADEC described hereinabove, the complexity of the troubleshooting process is increased by the use of redundant sensors and further complicated by the design of that engine control system, since it is basically two complete EEC systems operating simultaneously.

Not only does the number of diagnostic algorithms increase when troubleshooting an EEC, but the rigor and sophistication of the algorithms rises dramatically. Consequently, the troubleshooting manual author seeks to compress the diagnostic process as much as possible to keep the manual within a reasonable length. This often results in diagnostic algorithms comprised of extremely complicated logical steps, including multiple series of double negatives that must be understood and followed precisely by the technician in the field. Troubleshooting with the complex algorithms of the type noted above requires technician discipline and skill levels much higher than in the past.

Referring now to FIG. 1, there is illustrated in simplified schematic form, a jet engine 10 which is of a conventional twin spool type having a first spool 12 including a fan 14 driven by a low pressure turbine 16 and a second spool 17 having a high pressure compressor 18 driven by a high pressure turbine 20. A burner 22 of a conventional type is located between the compressor exit and turbine inlet and serves to heat the gaseous engine working medium in order to power the turbines and generate thrust. The high pressure spool and low pressure spool are not mechanically interconnected, but rotate independently. The engine also includes an augmenter 24 receiving discharged gas from the low turbine. The gas exits the engine via an exhaust nozzle 26. As is conventional, an actuator 28 is used to control the position of the exhaust nozzle and thereby vary the area of the nozzle opening.

Also illustrated schematically at 29 in FIG. 1 is a control system having an electronic engine control (EEC) 30 that receives signals from various components and sensors in the aircraft. The EEC is a full authority digital type control (FADEC). There are several parameters received by the engine electronic control which are indicated at 32, and include but are not limited to burner pressure, engine inlet total temperature, fan turbine inlet temperature, and engine inlet total pressure which are used both for control and diagnostic purposes. Other engine parameters are used by the EEC 30 to generate command signals to operate engine effectors, such as those which control burner fuel flow and the area of the exhaust nozzle in accordance with predetermined schedules selected to achieve optimum engine operation over the flight envelope. Also shown in FIG. 1 is a redundant EEC 31 identical to EEC 30 and configured therewith in the commonly owned, co-pending U.S. patent application Ser. No. 618,686, incorporated herein by reference.

The pilot controls engine power output using throttle lever 33. The angle of the throttle or power lever, as well as the rate of change of throttle lever angle, is determinative of the amount of power supplied by the engine. The EEC 30 determines the power lever angle and the rate of change of power lever angle in a conventional manner. The EEC 30 and EEC 31 are configured by the control system 29 to operate simultaneously. When a disagreement is detected by the control system 29 between control signals generated by either EEC or between the sensor signals presented thereto, control processors associated with each EEC are not halted. Rather, the effectors are blocked by the control system 29 from operating on control signals received from the EEC determined by the system 29 to be defective. The processors are allowed to continue execution so that data acquisition can be completed and the failure subsequently analyzed. Also configured with the control system 29 is an engine fault diagnostic system 34 as provided by the present invention.

Figure 2:
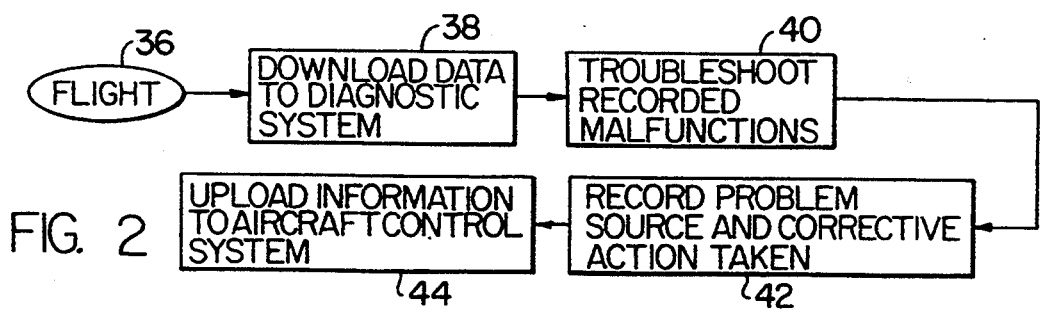
FIG. 2 is a simplified diagram showing the operation of a diagnostic system provided according to the present invention.

FIG. 2 is a simplified diagrammatic illustration of the operation of the diagnostic system 34. Data on the control system is taken during a flight (box 36) and downloaded thereafter to the diagnostic system (box 38). The data comprises a series of event codes indicative of a fault, such as a failed sensor, and the time at which the fault occurred. Malfunctions are then troubleshot (box 40). The sources of any problems are noted (box 42), along with a record of corrective action taken, if any. Finally, the information is uploaded back to the control system on the aircraft (box 44).

Figure 3:
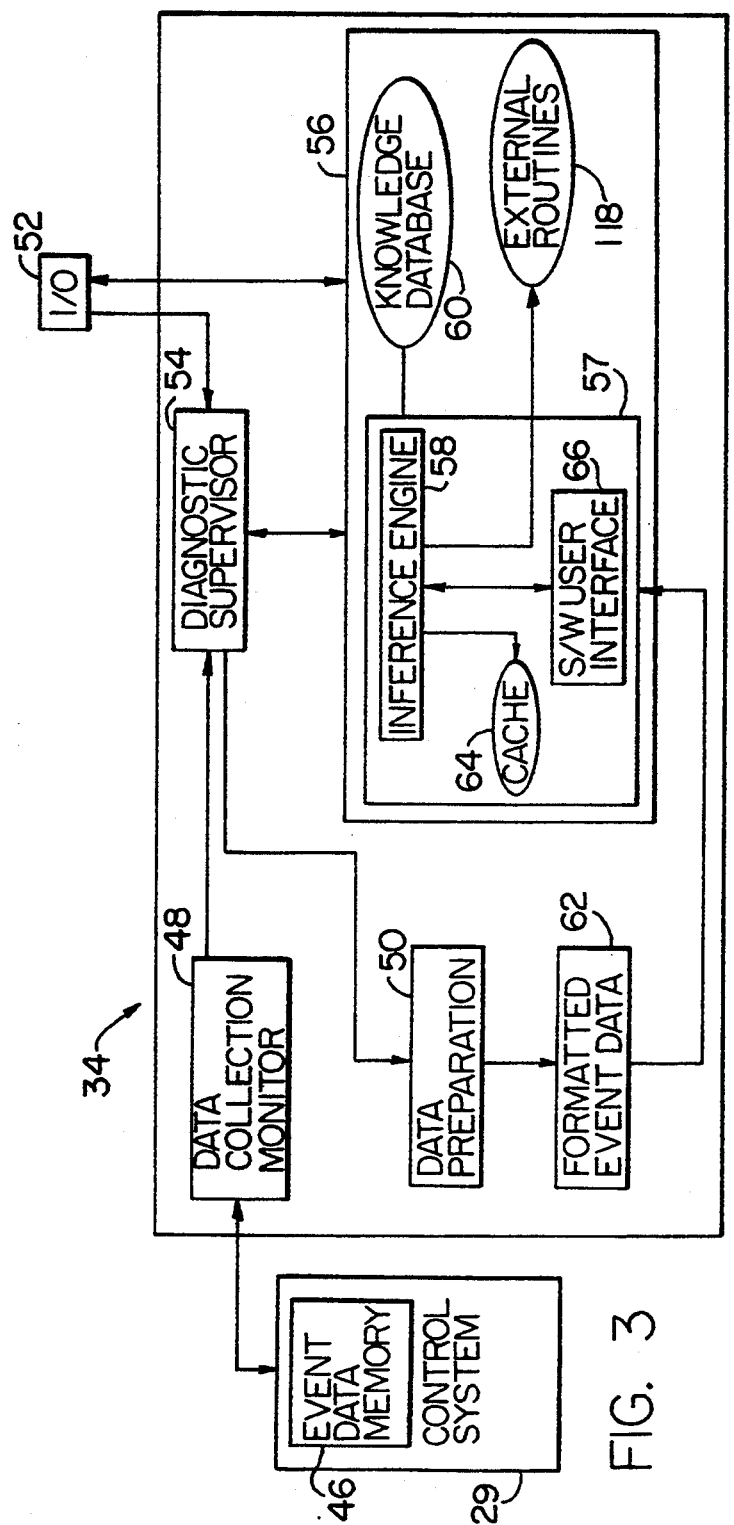
FIG. 3 is a simplified schematic illustration of a diagnostic system as provided by the present invention for use in troubleshooting the electronic engine control system of FIG. 1.

FIG. 3 is a simplified schematic illustration of a diagnostic system provided according to the present invention. The flight data referenced above is stored in a memory 46 associated with the control system on the aircraft. This flight data is downloaded to the diagnostic system and is passed by a data collection monitor 48 to a data preparation apparatus 50 for reformatting. The data collection monitor comprises a package of algorithms used by the present diagnostic system to download engine data from the digital engine control, view that data and access troubleshooting events or faults and clear the events once the troubleshooting process has been successfully completed. Lastly, the data collection monitor uploads the information back into the digital engine control at the completion of the overall process. In the preferred embodiment the data collection monitor and data preparation apparatus comprise computer programs associated with the diagnostic system.

The diagnostic system 34 communicates with the technician by means of an input/output device 52 of a known type, such as a video display and keyboard. The preferred diagnostic system also comprises, in part, a portable or laptop computer having an Intel 80386 or equivalent processor preferably with 8 Mb RAM, but which can operate with a minimum of 1 Mb of memory. The input/output device therefore is portable and receives commands and responses from the maintenance technician and provides output signals from the diagnostic system and prompts to the technician as set forth hereinafter.

The diagnostic system also includes a diagnostic supervisor 54, preferably an algorithm executed by the technician by means of the input/output device. The diagnostic supervisor has overall control of the operation of the different sub-algorithms set forth herein and puts the technician in an engine dam access troubleshooting loop. The diagnostic system further comprises an expert system 56 that includes a programmable expert system shell (ESS) 57 having an inference engine 58 for use in executing diagnostic algorithms. The ESS is of a type known in the art, such as the M.1 offered by Teknowledge, Inc. The M.1 is operable on a variety of IBM compatible personal computers as set forth above and is implemented in the C programming language. Software interface 66 is provided to allow the inference engine to communicate with the other components of the diagnostic system as well as function within the computer operating system.

The diagnostic supervisor first assigns an environment variable (Mi) that is a character string representing the directory where the overall diagnostic system resides. The diagnostic supervisor sets the default directory to the diagnostic system and deletes existing event data files associated with previous troubleshooting sessions. The diagnostic supervisor then, in the preferred embodiment, accesses the data collection monitor to download engine data. If the troubleshooting option is then selected by the technician, the data collection monitor will create two event data files (A.M1 and B.M1) and transfer control back to the diagnostic supervisor. In response, the diagnostic supervisor checks for the existence of the new files to confirm the selection of the troubleshooting mode. If it is determined that the troubleshooting mode was not selected, then the diagnostic supervisor will exit to the operating system.

If, however, the troubleshooting mode has been selected, the diagnostic supervisor executes the data preparation apparatus. This apparatus, preferably an algorithm, reads the contents of the A.M1 and B.M1 files and creates a newly formatted data file 62 with the same information. Also, the data preparation apparatus analyzes these files for the existence of any errors. If an error is found, the A.M1 program is deleted and a flag is set for the diagnostic supervisor to bypass the troubleshooting function. If the file is error free, the diagnostic supervisor executes the expert system shell.

When the technician is ready to commence the troubleshooting process he selects the "troubleshoot" option of the data collection monitor program set forth on that program's main menu. Control reverts back to the diagnostic supervisor after the creation of the two data files as mentioned above.

Knowledge database 60 is a database of both logical rules to be followed by the inference engine and facts established prior to the operation of the diagnostic system or created while troubleshooting a malfunction. Typically, the knowledge database will include those relationships and logical statements that would be found in a troubleshooting manual as well as in the service or technical literature for that engine. Conclusions reached by the inference engine are displayed to the technician and are added to the working memory or "cache" 64. The preferred knowledge database is comprised of many small knowledge database portions that are only accessed as needed, with the other portions remaining in a memory associated with the diagnostic system.

As detailed hereinafter, the inference engine can be operated in a development mode that displays to the engineer a labeled sequence of events corresponding to messages from the inference engine about the algorithm steps the inference engine is currently executing. In an operating mode these same events and conclusions are not displayed to the technician troubleshooting in the field. A current rule being evaluated by the inference engine can also be displayed, as is whether the rule has failed or succeeded.

Once accessed, the data collection monitor must be selected to download engine data from the digital engine control. Engine data for both controls in the FADEC embodiment is downloaded. The data will be placed in two separate permanent binary format files, one for each channel. Once the engine data is downloaded, the information therein is put into a format, typically ASCII, by the technician selecting an item from a menu display on the I/O device. The technician selects which channel of information is to be examined. At least one of the files must have been selected before troubleshooting with the present system can be initiated. If the technician wishes to see the data before troubleshooting, the present diagnostic system allows the technician to view the information from the main menu of the data collection monitor algorithm.

Maintenance codes such as 001, 002 and 003 indicate that the event is "active". Only events with maintenance codes of 001 and 002 require troubleshooting and subsequent maintenance. The 003 maintenance code is merely an advisory event. Other maintenance codes are generated by the present diagnostic system and signify that an event had maintenance action taken previously. The code indicates what that action was. A history of the 60 most recent events is maintained by the present diagnostic system.

The expert system of the preferred embodiment is most useful in situations where the knowledge needed to solve a particular problem is already understood and can be solved by an expert in a reasonable amount of time. Typically, the expert system seeks to divide a problem into a series of several sub-problems and solve each sub-problem independently. Each of the problems or sub-problems, such as the malfunctions in the control system of the present invention, are characterized by a finite set of possible outcomes. The inference engine collates and abstracts information about the malfunction and relates the malfunction to a general class of solutions and selects and refines one or more of the solutions.

The basic function of the inference engine is to accumulate evidence for or against the value of a particular expression. The inference engine primarily uses a backward chaining reasoning process to reach conclusions. Input data and the knowledge database are used by the inference engine to deduce facts or conclusions. When conclusions matching a specified pattern are made, a special set of high priority goals can be activated, thereby enabling the inference engine's forward chaining reasoning capability.

The present inference engine reaches conclusions by considering symbolic "expressions" that denote aspects of a malfunction, such as sensor signal values as compared to possible causes of the malfunction or solutions thereto. These expressions can be in either mathematical or in symbolic form. Interactions with the inference engines are directed towards determining values for particular expressions. The inference engine is accessed in response to the command signals from the diagnostic supervisor via the input/output device. The inference engine then seeks the values for the expressions that appear in the stated "goal" or "initialdata" specifications within the knowledge database or specified by the "find" command. The value of expression can be found in one of several ways. The value may be determined by inference, by internal arithmetic computation or by external computation. Alternatively, the diagnostic system may obtain the value directly from the technician in response to a prompt.

In operation, the inference engine will first determine whether the value can be computed for the expression being sought, either arithmetically or by concluding that there is a built in value in the knowledge database. As noted above, all conclusions made by the inference engine are stored in the cache. Therefore, the cache is the first place the inference engine looks when trying to find a value for a non-arithmetic expression. The cache receives values of expressions as they are determined in sequence, including ones that correspond to "no conclusion". If the inference engine finds in the cache a value for the expression, it returns the value to the system and proceeds with a search for the next value. If no value or an inconclusive value is found in the cache, the inference engine next accesses the knowledge database.

The knowledge database in the present invention comprises facts and rules about the engine and/or electronic engine control system which are arranged in a sequence. The inference engine accesses the knowledge database entries in that sequence and attempts to establish a value of the expression being evaluated. If the evaluation process is successful, that value is returned to the diagnostic system. Regardless of whether the evaluation was successful or unsuccessful, a notation is made in the cache to indicate that an inquiry was made and a value was either returned or not returned. The knowledge database also includes a series of "meta-facts". The meta-fact is most commonly a question which asks for the value of the expression by displaying text to the technician and prompting a response. Meta-facts are knowledge databased entries that provide information or directions as to how to determine the value of an expression. The response provided by the technician is then stored in the cache.

The rules are in the form of a premise and a conclusion which are evaluated using conventional Boolean logic, such as the connectives "or", "and" or "not". The present diagnostic system must determine the relevance of a rule. Each time a relevant rule is encountered it is tested. If the premise of the rule is found to be true, that value is noted in the cache along with that conclusion. However, if the testing results in the premise of the rule failing, no conclusion is noted in the cache. These rules may be stored in a separate rule database in dependence on the application. The knowledge database also can include meta-propositions which operate similar to that of the rules.

Note that the inference engine has a limited ability to deal with ambiguities in its analysis. It is possible to provide the knowledge database with a value directly or in response to a question that is qualified by a certainty factor. Should two values be indicated for the same expression, the inference engine will examine the certainty factors associated with each value and select the one that is greater unless the expression is designated "multivalued" by the multivalue meta-fact. All values with certainty factors are concluded. However in the preferred embodiment, this feature is not utilized.

Figure 4:
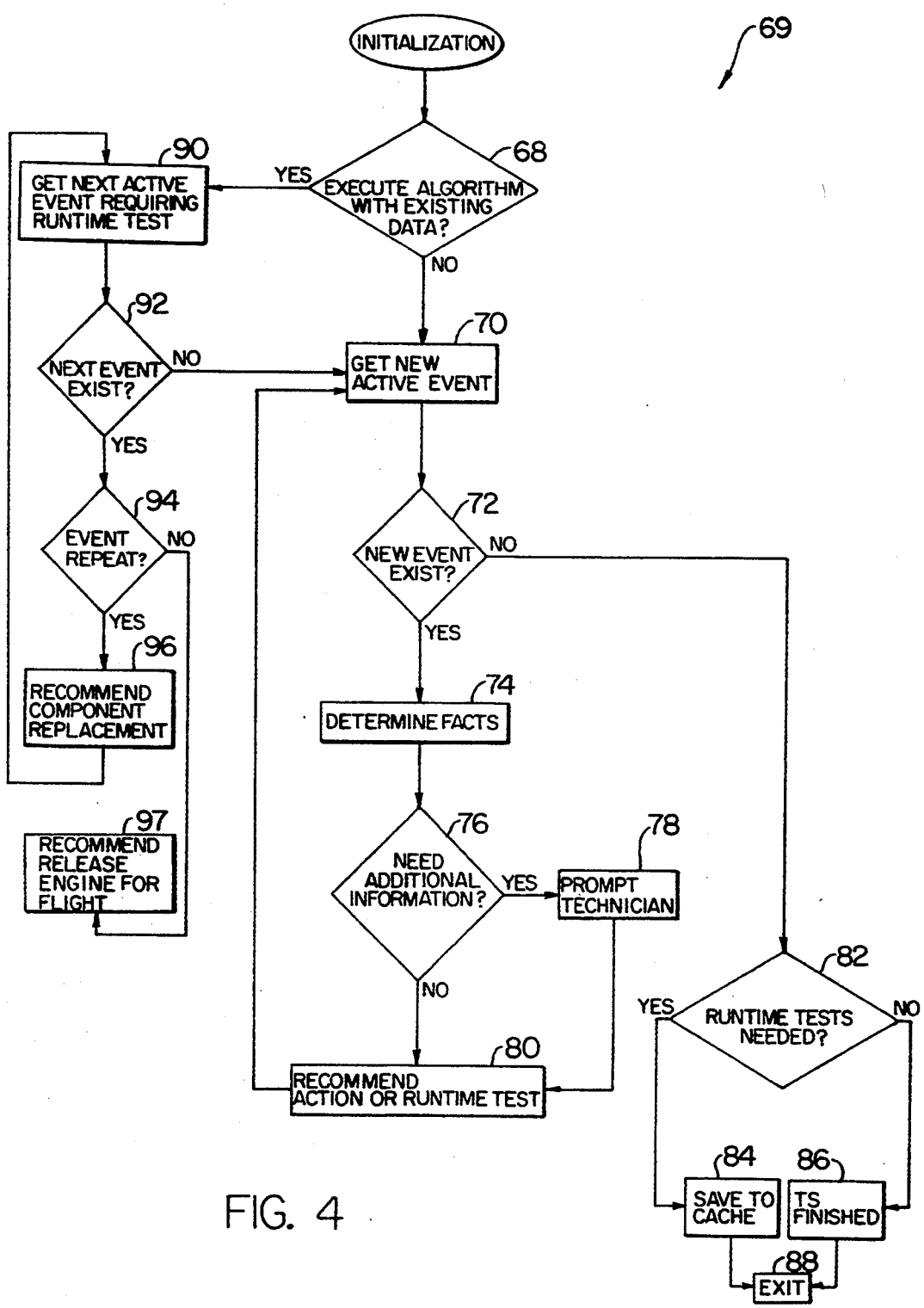
FIG. 4 is a diagrammatic illustration of an algorithm executed by an inference engine used with the diagnostic system of FIG. 3.

Referring now to FIG. 4 there is illustrated a simplified diagrammatic illustration of the operation of an algorithm 64 executed by the diagnostic system of FIG. 1. The aircraft control system is configured to monitor the several aircraft engine sensors as referenced above. In addition, the control system records any error signals generated by the control system during operation as well as the time at which the malfunction occurred. In the preferred embodiment the control system malfunctions can generate 500 event codes corresponding to discrete types of system component malfunctions. The corresponding troubleshooting manual in paper form exceeds 1,000 pages.

At block 66 the diagnostic system is initialized. The diagnostic system prompts the technician to determine whether the previous troubleshooting data is to be reanalyzed (block 68). If not, a new active event is requested from the flight database (block 70). The diagnostic system determines whether a new event exists at block 72. If a new event does exist, the diagnostic system obtains the related facts and rules from the knowledge database and event data file (block 74). Whether additional information is needed to perform the analysis is computed at block 76 and, at block 78, the diagnostic system presents a prompt to the technician for necessary information. The diagnostic system then performs the evaluation at block 80 and provides the recommended action or indicates the run time test needed to the technician.

Similarly, if a new event was not determined to exist at block 72, the diagnostic system will determine whether any run time tests are needed at block 82. If yes, the information already concluded is saved in the cache (block 84) after it has been obtained. If not, the message "finished troubleshooting" and/or the recommended action is displayed to the technician at block 86 before exiting the program (block 88).

For troubleshooting events that require subsequent run time tests ("yes" at block 68), the diagnostic system obtains the next active event requiring a run time test at block 90. The diagnostic system then determines whether the next event exists (block 92). If yes, the diagnostic system determines if the event repeated after a run time test from the flight data (block 94). If the event repeated, the diagnostic system will recommend component replacement (block 96). If the event did not repeat, the diagnostic system will recommend releasing the engine for flight (block 97). Thereafter, the diagnostic system will attempt to obtain the next active event and enter the algorithm again at block 90. Should no "next event" exist, the algorithm reenters the main program at block 70.

Each troubleshooting session is referred to as a "consultation". When the diagnostic supervisor executes the ESS, the inference engine will check the cache for the value of the parameter "setup". If a value is not there the inference engine will look into the knowledge database to see if there is a value contained therein for the setup parameters. The technician is prompted for "setup" information, if needed.

Figure 5:
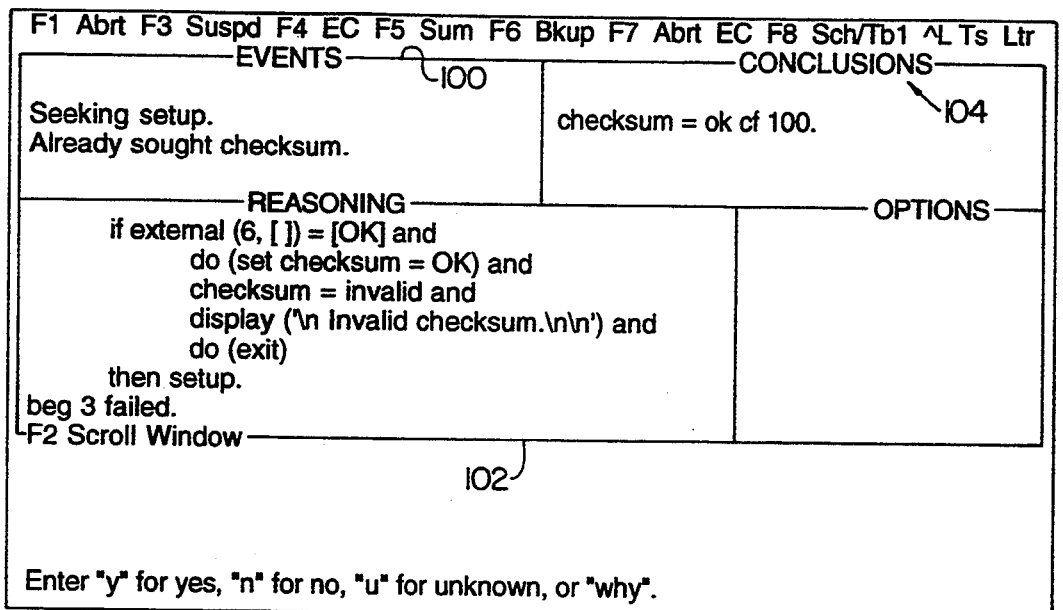
FIG. 5 is an illustration of a frame displayed to a development engineer by the diagnostic system of FIG. 1.

FIG. 5 illustrates an exemplary frame displayed to the engineer during the development mode of the diagnostic system. As noted above, much of the information set forth during the development mode is not displayed to the technician during the troubleshooting process. However this information is illustrative of the operation of the diagnostic system. Frame 98 is comprised of a plurality of fields. "EVENTS" (box 100) contains information on the current parameter being verified. The "REASONING" box 102 lists the rules currently being evaluated. The "CONCLUSIONS" box 104 lists those parameters that have been processed.

In the example shown with respect to FIG. 5, there are several rules loaded into the knowledge database that have "setup" as a conclusion. The inference engine finds each rule with the conclusion of "setup" and attempts to prove true each premise of the rule. The first premise causes an external routine to be executed. If all the premises of one of the rules are met, then "setup" is concluded and it is assigned a value of "yes" that corresponds to the default value. If however, the value of "setup" cannot be concluded from the knowledge database, the inference engine will prompt the technician for a value. An external routine verifies the integrity of selected diagnostic system files by performing a "checksum" procedure. The value of this variable can either be "OK" or invalid.

When the inference engine evaluates a rule (e.g., "setup"), the premises of that rule instruct the inference engine to execute several logical functions before the rule is finally determined to have "passed" or "failed". One may be to load another knowledge database portion before evaluation. Once a value is established, that fact is provided to the diagnostic system program as well as to the engineer by means of the display listed at the bottom of the "REASONING" box. Moreover, the new fact is added to the cache and to the "CONCLUSIONS" index.

In FIG. 5, the next premise displayed in the "REASONING" box sets the "checksum" value equal to the value of the variable "OK" in the cache. The "CONCLUSIONS" box indicates that this value has been added to the cache. A CF (certainty factor) value of 100 indicates that the inference engine has assigned the highest possible value (100% certainty) to the value. Those skilled in the art will note that certain inference engines can be configured to have certainty values of less than one thereby approximating an "unknown" function value. However, with the present invention certainty factors of less than 100 are not used.

If a premise "fails" because, for example, the value of "setup" is determined to be invalid, the whole rule fails. The inference engine notes this at the bottom of the "REASONING" box. Next, the inference engine locates the subsequent rule with "setup" as its conclusion and tries to evaluate each premise in that rule for validity. Eventually, all premises in this or another subsequent rule are evaluated as "true" so the conclusion of "setup" has finally been reached. Setup equals "yes" is added to the cache as well as the "CONCLUSIONS" portion of the display. The inference engine also notes that rule has succeeded in the reasoning file as well as the events file.

The saved cache file from the previous troubleshooting session for this engine is loaded into the working cache. It contains at least one fact which has been added to the cache and is displayed in the "CONCLUSIONS" box for the engineer when the diagnostic system is operated in the development mode. There is a cache file saved for each engine consultation that is used to pass information from one session to another. The present consultation is assumed to be a brand new troubleshooting session. Note that reruns mandate the performance of some tests on the engine that, upon completion, require the engine data to be downloaded to the diagnostic system as indicated above. The inference engine examines the contents of the cache for a value of "reran" and indicates to the technician that "reran" has already been sought. The parameter "reran" set equal to "no" indicates that the present troubleshooting session is not a return from the previous troubleshooting sessions in which an engine rerun was required and in which the session was temporarily suspended.

Figure 6:
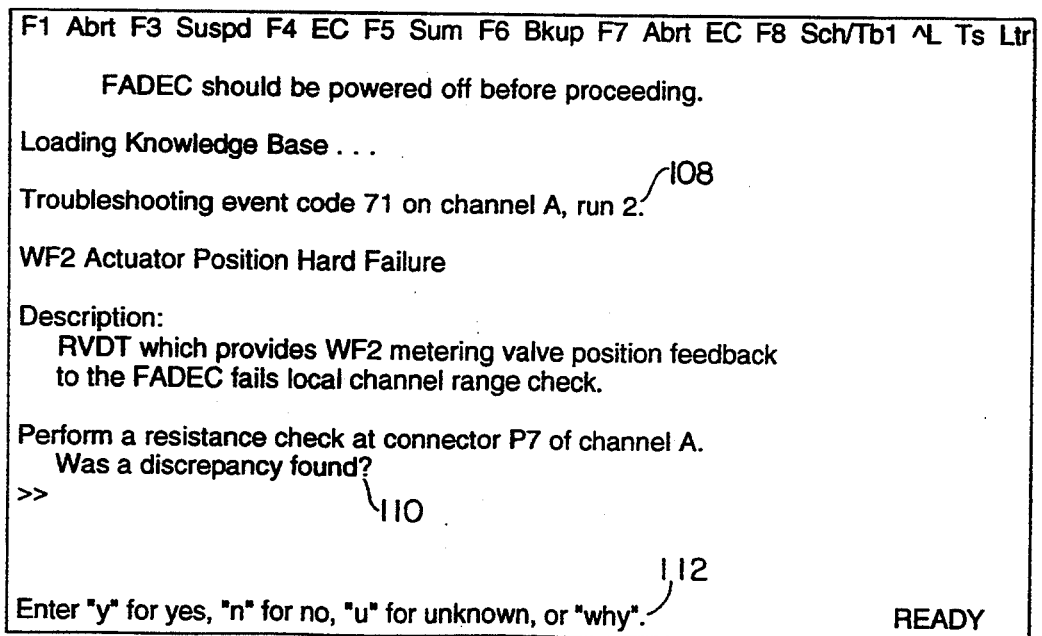
FIG. 6 is an illustration of a first frame displayed to a technician by the diagnostic system of FIG. 1.

FIG. 6 is a simplified illustration of a display frame 106 presented to a technician during a troubleshooting session. The inference engine has determined at line 108 that event code 71 needs to be troubleshot. Events are troubleshot in order of occurrence. Event code 71 is the only event which is active, corresponding to a maintenance code of 001. The diagnostic system loads that portion of the knowledge database which corresponds to an event code 71 to supplement the currently loaded knowledge database. The values for the title, description and other important facts about the event that remain static have been sought and loaded into the cache. The inference engine has, at frame 106, determined all of the facts possible from the engine data before presenting the technician with a question. Once the values for title and description have been obtained, the inference engine is directed to display them to the technician along with the corresponding first question 110. The technician then enters a response selected from the available options (line 112).

The knowledge database portion used in troubleshooting event code 71 demonstrates the use of bundled software referred to in the industry as "macros". With the use of macros in knowledge database portions parameters can be used in several premises of several rules to allow for the use in troubleshooting events with minor differences in procedures. For example, one procedure might require a resistance check of an engine component (e.g., the WF2 metering valve circuit) and another might require a resistance check of a different circuit. In the preferred embodiment, all of the question language is prewritten and stored in the knowledge database for the main diagnostic program rather than composed by the inference engine when technician input is required.

Note that the present diagnostic system is configured to examine a two channel FADEC, channel A and channel B. Consequently, the present diagnostic system will customize the diagnostic procedures accordingly. As seen in frame 114 of FIG. 7, the algorithm is informed that the local channel is "A" because that is the channel that the event was detected on so the question is customized to specify that channel. With other information that is needed by the diagnostic system, the channel may not be the only difference in procedures where these procedures are channel specific. For instance, the corresponding connector name on the opposite channel may be different. The present diagnostic system specifies the correct connector name as well. See for example, line 116.

The knowledge database set forth herein and external routines 118 accessed by the inference engine reflect the contents of the troubleshooting manual and the requirement list(s) associated therewith, and are typically shown to the technician during the process. In the preferred embodiment the knowledge database can be customized by the programmer to have its own explanation for a question. However, the inference engine can display its own reasoning culled from a combination of the rules, questions already asked and answers to those questions.

Before requesting a run time test for an event, troubleshooting is suspended and the present diagnostic system is programmed to seek a second active event code in case there is more than one active event which would require a run time test. All troubleshooting events which require additional data are determined first in order to minimize the number of times troubleshooting must be suspended for run time tests. If no additional event codes are found, the session is temporarily suspended, the "reran" parameter is set to "yes" and the cache is automatically saved so that the session may continue at a future date.

As noted above, the knowledge database portion will have a software flag set to inform the diagnostic system that the current interaction is a continuation of an earlier consultation. In that case the diagnostic system confirms that a rerun was actually performed. In the present example illustrated in FIG. 6, an answer of no was provided by the technician (line 108) in response to a prompt so the diagnostic system recommends replacing a component just as if the event did repeat. The logic for troubleshooting when the technician does not acquire new data by rerunning the engine does not appear in the troubleshooting manual for that particular event. This is another example of how the present diagnostic system is an improvement over the prior art, as additional sequences of logical steps can be included that are transparent to the technician.

The written troubleshooting manual includes procedures for event 71 that recommend to replace components in a certain order based on previous maintenance actions. See page portion (Box 120) in FIG. 8. The present diagnostic system calls an external routine which reviews non-active events in an engine data file looking for a maintenance code that first matches the replaced augmenter control maintenance action recommended in the present example. Since none exist, the diagnostic system recommends replacing the augmenter control. If however, the diagnostic system did find that maintenance code, it will search for another maintenance code or the next component (local channel FADEC in the present example). If all the components in the list have already been replaced, the diagnostic system simply recommends replacing the first component on the list.

As set forth above, the present diagnostic system examines the data looking for the next event that requires a rerun of the data. If none is found, then the diagnostic system looks for new active events to start a new troubleshooting session. If the current event (event code 71) repeated, this would not be considered a new active event. The cache is initialized at the end of the troubleshooting process for the next troubleshooting session and saved to a corresponding data file. Control is passed back to the diagnostic supervisor and the data control monitor program is accessed, again as above. Note that the diagnostic system also includes an algorithm to review a log of a troubleshooting consultation for a particular event accessible from both the diagnostic supervisor and from the DOS or equivalent operating system. The technician can view the recommended action by the diagnostic system again, or perhaps for the first time, if the current technician is one different from that of the troubleshooter. This is important in applications where a problem is diagnosed at a location remote from the service facility. Further, note that the present diagnostic system does not automatically assume that recommended action is going to be accomplished. It merely recommends action.

Important features of the present invention include the analytical ability of the diagnostic system to analyze malfunctions in view of the following. First, the temporal relationship of the malfunction is important, as certain malfunctions are dependent on the occurrence of others. For example, certain engine configurations will have a relationship between the occurrence of a low oil pressure signal followed thereafter by a high temperature and/or an overpressure signal. The analysis of the present diagnostic system will be different if the overpressure and/or overtemperature signal occurs prior to the recordation of a low oil pressure signal. This is because the high temperature and/or overpressure signal condition may be the result of low oil pressure. Therefore, the failure of a component in the lubrication system may be expected to cause a series of events, as evidenced by the generation of first a low oil pressure signal and then the other events (e.g., high temperature) indicative of dependent faults. It is not necessary to test the integrity of the high temperature sensor in this example.

The present system also analyzes the presence or absence of several independent fault indicators. For example, if the database indicates that malfunction signals indicative of a failed component X and a component Y and a component Z were present in a certain temporal relationship (e.g., simultaneously), the diagnostic system will undergo a different analysis than if the flight database indicated failings of components X, Y and Z in a different temporal relationship, (e.g., sequentially). In the above example, a necessary consequence of a component failure in component A (oil pump) will always yield a signal indicative of a low oil pressure unless that sensor is defective. Consequently, it is necessary for the technician to consider the cause of the low oil pressure signal, such as a failed sensor.

An additional feature of the present invention allows the diagnostic system to be configured with external information such as availability of parts and/or tools needed to fix the malfunction. It is often the case that the engine malfunction has occurred in a geographic location remote from one which has the required tools, parts or local expertise to effect a repair. Consequently, it is often not advisable for the technician to begin to repair the engine under those circumstances. The present diagnostic system provides to the technician sufficient information to halt the repair process at a certain point as circumstances mandate and instruct the technician to have the repair accomplished at another facility or to insure the availability of tools, pans and/or expertise. As an example, certain sensors may require dismantling of intermediate components (gaskets, etc.) to effect replacement. The present system would instruct the technician not to attempt repair, since that facility may lack that part (gasket).

The preferred embodiment also can be configured with sufficient pictures and/or graphics in the sequence of the suggested repair steps (e.g., resistance checks) to enable the technician to more effectively service the malfunction. The present invention also is useful in the event of any litigation relating to the aircraft in that all maintenance and repair procedures to the control system are completely documented, since the present invention provides for an accurate, detailed log of all malfunctions as well as the steps undertaken by the service technicians in maintaining the aircraft engine and repairing any malfunctions as well as the recommendation to the technician in this regard.

The present invention is further characterized by the capability of the diagnostic system to "back up a step" during the evaluation process. As demonstrated at line 122 and subsequent lines of FIG. 7, the technician has the ability to instruct the inference engine to retrocede in the algorithm and revisit a prior step in the evaluation process should the diagnostic system determine that an erroneous input has been provided from the technician. When selected by the technician, the "backing up a step" feature displays that the diagnostic system is accomplishing the same. Internally the diagnostic system is saving the cache to a separate file and calling an external routine to manipulate this file loading the cache back in and resume troubleshooting. This external algorithm determines what should be deleted from the cache in accordance with the question and the answer. Deleted from the cache are the facts that were added because of the previous answer to the previous question. This requires that all of the ramifications of that response, including entries in the cache and the other fact data files be reconfigured.

The "backing up a step" process can be accomplished sequentially for all of the questions in the consultation with two exceptions. Once the diagnostic system begins to troubleshoot a new event, the conclusions reached for all previously troubleshot events cannot be changed. Also, once a consultation is suspended for a run time test, the conclusions reached during that session can then be no longer changed. This enables a technician who mistypes an answer, misunderstands or misinterprets something during the consultation to correct his response more easily than simply exiting and then restarting the session.

The present diagnostic system also provides for a true "third" response as opposed to that provided by the prior art. Known systems such as the M.1 expert system discussed hereinabove are characterized by the ability to provide an uncertainty with a response. However, the present diagnostic system includes the capability of providing a third unknown response which allows the technician to evaluate the malfunction in a reduced time.

There are further features of the present invention which represent advances over the prior art. A consultation can be completely aborted at any time allowing the diagnostic system to restart the consultation later. The technician may also suspend the consultation at any time during that consultation. A subsequent entry begins where the consultation left off. If the technician is troubleshooting several events and wishes a list of all of events troubleshot so far with the corresponding recommendations, the present diagnostic system will provide a printed or visual display thereof. Analysis of individual events can be aborted or postponed, and the present diagnostic system will then continue to the next event.

The diagnostic system includes data files containing schematics and resistance tables. These can be presented to the user at any time during the diagnostic session. These are displayed in a table format. Each table is configured with an extra column not seen in the troubleshooting manual for data entry by the technician. For example, after a resistance check is performed, the value can be entered into the appropriate row of the table. This value is saved for reference by the technician. The diagnostic system can also be programmed to use these values so entered to determine if the resistance check passed or failed. A circular buffer of logs for a select number of previous troubleshooting sessions for a particular engine is typically saved.

Similarly, although the invention has been shown and described with respect to a preferred embodiment thereof, it should be understood by those skilled in the art that various other changes, omissions and additions thereto may be made therein without departing from the spirit and scope of the present invention.

We claim:

1. A system for use in diagnosing a malfunction in an aircraft engine from engine sensor signals including signals corresponding to engine faults, said system comprising:

a diagnostic supervisory signal generator means for generating system command signals;

an input/output device for receiving signals from and sending signals to a technician;

a knowledge memory means having stored therein signals corresponding to a database of engine sensor signal values and facts and rules relating each of said engine sensor signal values and facts with selected ones thereof, each of said rules including a logical premise and conclusion;

an inference engine means for receiving said knowledge memory means signals and, in response to said system command signals, for performing an inference engine test to establish the cause of the engine faults and generating signals indicative thereof, said inference engine test including the steps of:

determining from said engine sensor signals a first series of rules to be tested;

searching said knowledge memory means for signals corresponding to one of said engine sensor signal values and facts that establishes the validity of a first rule conclusion;

generating signals for said input/output means for querying said technician for input signals that establishes the validity of said first rule conclusion;

receiving signals from said input/output means indicative of technician input signals;

inferring the value of a first rule premise signal corresponding to a first rule premise associated with said first rule conclusion in dependence on the establishment of the validity of said first rule conclusion, determining a second series of rules to be tested in dependence on said first rule premise signal value; and a retroceding means for receiving a signal indicative of an erroneous input signal and, in response thereto, determining all of said first rule conclusion and premise signal values established as a result of said erroneous input signal; said retroceding means further for removing all the erroneously established signal values from said knowledge database.

2. The diagnostic system of claim 1 wherein said inference engine test further comprises the steps of:
selecting a subsequent rule conclusion; and
generating signals corresponding to the value of said subsequent rule conclusion and inferring therefrom the values of signals corresponding to an associated subsequent rule premise.

3. The diagnostic system of claim 1 further comprising a metafact memory means having stored therein signals corresponding to aircraft engine sensor signal value related metafacts and wherein said inference engine test further comprises the steps of searching said metafact memory means for signals corresponding to one of said metafacts and generating signals for said input/output means for prompting the technician for a value therefor.

4. The diagnostic system of claim 1 further comprising a data preparatory means for receiving said engine sensor signals and generating therefrom signals in a preselected data format.

5. The diagnostic system of claim 1 wherein said knowledge database is divided into a plurality of knowledge database portions, and said diagnostic system further comprises a means for moving a selected one of said knowledge database portions into a computer memory means for communicating with said diagnostic system.

6. The diagnostic system of claim 1 further comprising a means for suspending operation of said diagnostic supervisory signal generator means at a selected one of said steps and returning thereto directly after a suspension of test.

7. The diagnostic system of claim 1 further comprising a log memory means for storing signals indicative of engine faults in previous sets of said aircraft engine sensor signals and comprising a means for generating signals for said input/output means indicative of said engine fault signals stored in said log memory means.

8. The diagnostic system of claim 1 further comprising a memory means for storing signals indicative of events processed during said inference engine test.

9. The diagnostic system of claim 1 further comprising a memory means for storing signals corresponding to aircraft engine components generating said fault signals, said input/output means further comprising display means configured to present said aircraft engine component signals to said technician in response to said system command signals presented therefrom.

10. The diagnostic system of claim 9 wherein said aircraft engine component signals further comprise signals corresponding to electrical representations of schematic diagrams of aircraft electrical circuits.

11. The diagnostic system of claim 1 further comprising a memory means for determining the temporal order of said engine fault signals and a means for establishing an order of the testing thereof in dependence on said temporal order.

12. The diagnostic system of claim 1 wherein said knowledge database means further comprises a means for determining which of said engine fault signals are indicative of independent and dependent type of engine faults and comprising a means for establishing an order of the testing thereof in dependence on said determination.

13. The diagnostic system of claim 12 further comprising a means for testing only said engine fault signals determined to be indicative of said independent type engine faults.

14. The diagnostic system of claim 12 further comprising a means for determining the temporal order of signals indicative of first and second independent engine faults and for establishing an order of the testing thereof in dependence thereon.

15. The diagnostic system of claim 1 wherein said retroceding means generates a third series of rules to be tested, the rules of said third series being selected in dependence on said removed values.

16. The diagnostic system of claim 1 wherein said retroceding means is disabled should said inference engine test be suspended.

17. The diagnostic system of claim 1 wherein said retroceding means is disabled should said inference engine test be terminated.

18. The diagnostic system of claim 1 further comprising an expert system shell (ESS) for receiving said system command signals, generating therefrom signals to control the operation of said inference engine, and providing a cache memory means for storing test result signals.

19. The diagnostic system of claim 1 wherein said inference engine means test further comprises the steps of inferring the values of signals corresponding to a second rule premise in dependence on the establishment of said first rule conclusion.

* * * * *